US011838339B2

(12) United States Patent
Bieger et al.

(10) Patent No.: US 11,838,339 B2
(45) Date of Patent: Dec. 5, 2023

(54) METHOD AND DEVICE FOR GROUP COMMUNICATION

(71) Applicant: Continental Automotive GmbH, Hannover (DE)

(72) Inventors: Stefan Bieger, Hannover (DE); Gerhard Dochow, Hannover (DE)

(73) Assignee: Continental Automotive GmbH

( * ) Notice: Subject to any disclaimer, the term of this patent is extended or adjusted under 35 U.S.C. 154(b) by 0 days.

(21) Appl. No.: 17/775,749

(22) PCT Filed: Dec. 4, 2020

(86) PCT No.: PCT/EP2020/084670
§ 371 (c)(1),
(2) Date: May 10, 2022

(87) PCT Pub. No.: WO2021/110931
PCT Pub. Date: Jun. 10, 2021

(65) Prior Publication Data
US 2022/0385706 A1    Dec. 1, 2022

(30) Foreign Application Priority Data
Dec. 6, 2019  (DE) .......................... 10201919099.5

(51) Int. Cl.
*H04L 65/403* (2022.01)
*H04L 65/1069* (2022.01)
(Continued)

(52) U.S. Cl.
CPC ........ *H04L 65/403* (2013.01); *H04L 65/1069* (2013.01); *H04L 65/4061* (2013.01); *H04L 67/52* (2022.05)

(58) Field of Classification Search
CPC ............... H04L 65/403; H04L 65/1069; H04L 65/4061; H04L 67/52
(Continued)

(56) References Cited

U.S. PATENT DOCUMENTS 7,620,413 B2    11/2009  Jen
11,062,531 B2    7/2021  Wang
(Continued)

FOREIGN PATENT DOCUMENTS

| CN | 105050053 A | 11/2015 |
| CN | 110087213 A | 8/2019 |

(Continued)

OTHER PUBLICATIONS

International Search Report and Written Opinion for International Application No. PCT/EP2020/084670, dated Feb. 18, 2021, with partial English translation, 8 pages.

(Continued)

*Primary Examiner* — Glenford J Madamba
(74) *Attorney, Agent, or Firm* — RatnerPrestia

(57) ABSTRACT

A communication method between road users, which can each connect to a server via at least one communication interface. The following steps carried out by the server for establishing communication: establishing local and thematic information for determining communication participants; determining a group of communication participants based on local and thematic information, with a local area being defined for the local restriction of the communication participants and with at least one technological aspect and/or one interest-based aspect being taken as a basis for the thematic restriction on the part of the server; and granting permission for data communication by the road users based on the server prioritizing the data transmitted by the road users to the server once the group has been determined. The (Continued)

local and thematic information determined from the average of the spatial coordinates of the road users and respective average speed and average direction of the road users.

11 Claims, 1 Drawing Sheet

(51) Int. Cl.
 *H04L 65/4061* (2022.01)
 *H04L 67/52* (2022.01)
(58) Field of Classification Search
 USPC .......................................... 709/224
 See application file for complete search history.

(56) References Cited

U.S. PATENT DOCUMENTS

| | | |
|---|---|---|
| 2005/0222752 A1 | 10/2005 | Sokola et al. |
| 2006/0046741 A1 | 3/2006 | Loesch |
| 2007/0036100 A1* | 2/2007 | Shaffer ................ H04W 4/021 370/328 |
| 2011/0009127 A1 | 1/2011 | Spjuth |
| 2015/0039691 A1 | 2/2015 | Sharma et al. |
| 2017/0294131 A1* | 10/2017 | Jedrzejewski ........ H04W 76/45 |

FOREIGN PATENT DOCUMENTS

| | | |
|---|---|---|
| DE | 602004012553 T2 | 5/2009 |
| WO | 2005101689 A1 | 10/2005 |

OTHER PUBLICATIONS

International Search Report and Written Opinion for International Application No. PCT/EP2020/084670, dated Feb. 18, 2021, 13 pages (German).

German Examination Report for German Application No. 10 2019 219 099.5, dated Jul. 31, 2020, with translation, 9 pages.

English Translation of the Written Opinion for International Application No. PCT/EP20201084670, dated Feb. 18, 2021, 5 pages.

Chinese Office Action for Application No. 202080083018.6, dated Jul. 4, 2023 with translation, 13 pages.

* cited by examiner

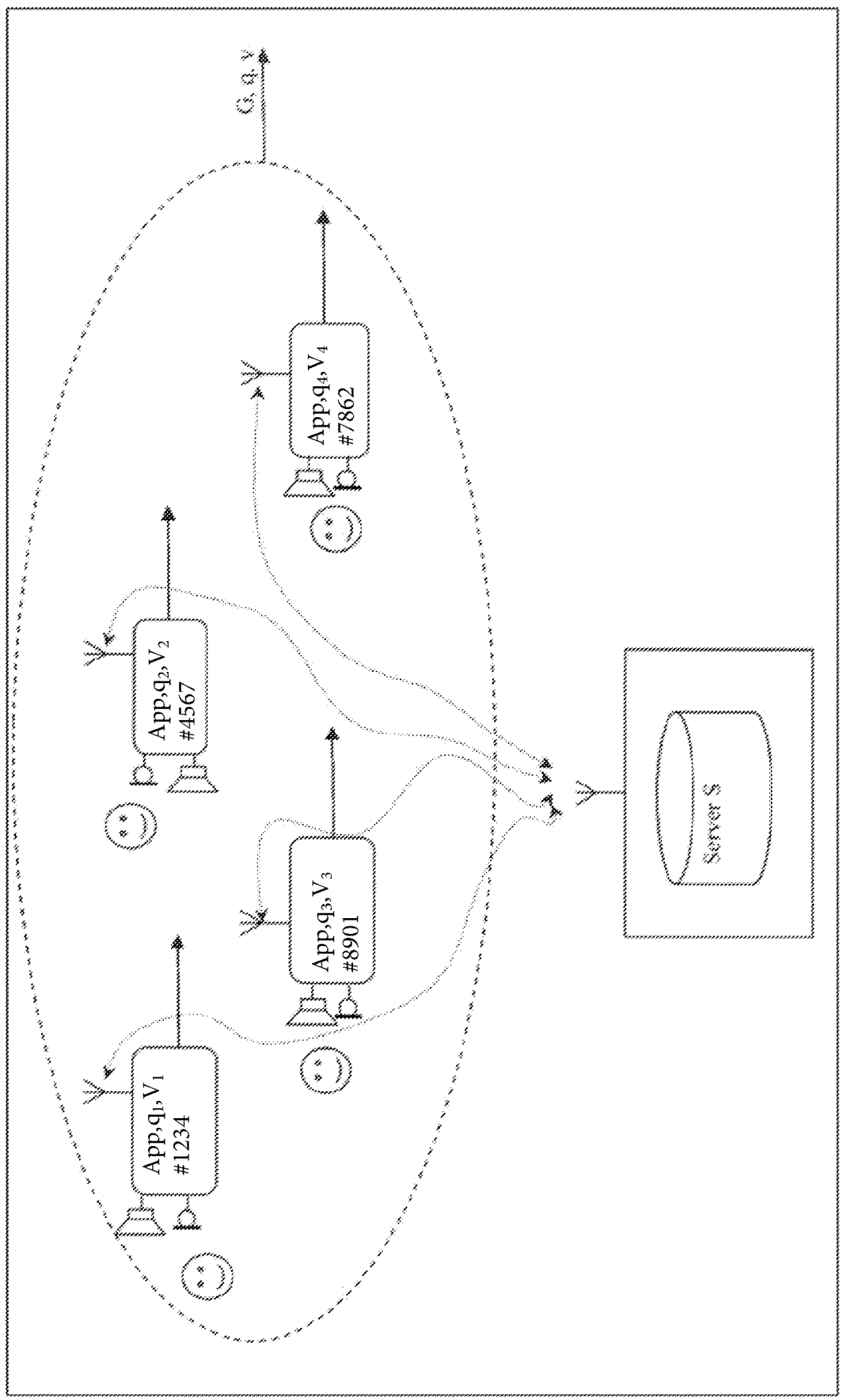

METHOD AND DEVICE FOR GROUP COMMUNICATION

CROSS REFERENCE TO RELATED APPLICATIONS

This application is the U.S. National Phase Application of PCT International Application No. PCT/EP2020/084670, filed Dec. 4, 2020, which claims priority to German Patent Application No. 10 2019 219 099.5, filed Dec. 6, 2019, the contents of such applications being incorporated by reference herein.

FIELD OF THE INVENTION

The present invention relates to a method and a device for group communication between road users.

BACKGROUND OF THE INVENTION

Push-to-talk over Cellular (PTToC, PoC or simply PTT) is a standard for cell phones that describes quick and easy voice communication for groups in mobile radio networks and works according to the walkie-talkie principle.

This service offering makes it possible for mobile operator customers to use the cell phone to send a voice message to one or more recipients with just the touch of a button. The message is not transmitted via a circuit-switched mobile radio connection, but via a packet-switched mobile radio connection (GPRS): The voice message is first divided into data packets and sent to a server. The server forwards the packets to the connected, active clients (client-server model). This process explains why the message usually arrives at the recipient with a delay (depending on the reception strength in the mobile radio network).

Communication usually takes place in half-duplex mode, which prevents simultaneous speaking and listening. As soon as a client is speaking, all other clients can only listen. Any attempt to speak anyway is blocked by the server. Exceptions here are the priority calls integrated in some push-to-talk applications, as occur in digital radio systems. This makes it possible to suppress radio messages with a lower priority.

The voice quality is similar to that of digital or trunked radio, but is clearer and easier to understand than with radio equivalents due to the digital packet transmission. Furthermore, with some push-to-talk providers, it is possible to listen to voice messages again using a history function.

Technically, communication works in a similar way to Voice over IP (VoIP). The group participants first receive signaling via the SIP protocol, then the voice, so-called "talk bursts", is transmitted via RTP. There are two reception modes: automatic and manual reception. Whereas the voice message sounds directly from the cell phone's loudspeaker during automatic reception, with manual reception, the user first has to press a button in order to hear the first and all subsequent voice messages.

WO 2005/101689 A1, incorporated herein by reference, discloses that a driver communicates the position and any desired communication radius and/or desired direction, such as in the direction of travel or against the direction of travel, to a server. The server determines other participants in the corresponding area as well as their user ID and shows them on a display, including position, coordinates or direction. The display is not effected on a map. There is a targeted selection of individual or multiple participants or a general selection of all participants. A request for communication is made to selected participants and the request is accepted or rejected. Pressing a push-to-talk button sends a voice message to all members of the group. When the button is released, a message is received from other participants. For this purpose, a priority rule is used when speaking at the same time based on the vehicle type, e.g. priority for emergency vehicles, but is also used for participants of the same rank. Group dialing can also be carried out remotely, e.g. group in the destination city, or independently of location, such as family members, colleagues, friends traveling together.

In WO 2005/101689 A1, it is first identified and shown whether and which vehicles are in the vicinity by means of an anonymous user ID by selecting: near/medium/far and/or in the direction of travel of the ego vehicle, with which a communication group can be formed. To do this, the user can select individual/multiple users or all.

Pressing the PTT button sends a group member's message to all other group members—releasing the button allows messages from the other members to be received/heard. A prioritization scheme that is not described in any more detail regulates the assignment of the transmission rights when multiple group members want to transmit at the same time. In addition to forming a group at the current location, it is also possible to select groups at defined distant locations or to define topic-related groups (family, colleagues) without an explicit location reference.

WO 2005/101689 A1 allows the user to roughly enter the radius (near/medium/far). However, it is described that the server determines its own search radius within these rough specifications, which is based, for example, on the communication environment (e.g. mobile radio cells) or system specifications, such as division of the route traveled into communication sections with a length of 1 kilometer. In the close range, the disclosed system basically takes into account the section of its own position as well as the three sections in front of it and the three sections behind it. There is no expansion/restriction of the communication area explicitly on the basis of the number of potential participants. It can also be inferred from the document that a list of the members can be drawn up, in which the position coordinates and the direction are also given. The currently selected rough radius (near/medium/far) is indicated in the list heading. The distance to the members and the visual highlighting of the current speaker is not visible here.

The document mentioned enables the targeted selection of individual participants in the defined area, and this selection serves to form groups, but takes place before the actual communication.

Adding additional members to an existing group is described. The removal of members or the formation of subgroups from the existing group is not explicitly described. There is also no explicit description of how to leave a group.

U.S. Pat. No. 7,620,413 B2, incorporated herein by reference, describes multicast via push-to-talk. A token for authorization to send is issued via a queue either by FIFO (whoever presses first, sends first), then the next or individual prioritization of the user or a combination of both or other queue schemes. It also mentions creating, deleting and modifying (adding/removing members) group lists. However, this change is made via the website interface and not explicitly during the existence of the group.

The PTT apps for smartphones are known. The iPTT is a push-to-talk app and implements a walkie-talkie functionality. It enables point-to-multipoint group communication, point-to-point communication within a group channel or direct point-to-point communication with a single participant. The document mentioned describes a rights assignment by queue. If a speaker presses their PTT first, they also transmit first. The PTT button of the second speaker that is pressed later is added to a FIFO queue, for example, and then comes next. The display of the speaking request for other group members is not mentioned here.

SUMMARY OF THE INVENTION

Road users can communicate with each other using CB radio, for example to warn each other of dangers on the route or of traffic jams. Comparable communication in this form has not yet been possible using modern mobile radio technologies.

Up until now, road users have been able to exchange their cell phone numbers or form a text messenger group in order to get in touch with one another while driving.

An aspect of the invention aims to enable priority-based communication in a group of participants, which in particular solves the technical disadvantages of PTT communication.

The inventive consideration lies in solving the problems that arise from mobile-radio-supported group communication. Spontaneous, local group communication is made possible between mobile radio participants accidentally or intentionally in the vicinity and optionally moving in the same direction. This is often linked to common goals or interests of the participants, which often goes hand in hand with a natural need to communicate with the other participants.

The token-based permission to speak prevents communication from being intentionally paralyzed by interference sources. Dynamic radius adjustment ensures that the group size is always appropriate. The system can be designed largely anonymously, so that a basis for non-binding communication between the participants is created. Nevertheless, mechanisms are foreseeable, such as by the speaker rating, which make it very difficult for intentional interference sources to undermine the joint conversation.

According to an aspect of the invention, a fair regulation of communication is advantageously described so that a solution to the problems that occur due to the technical circumstances of PTT communication can be specified.

In talk rounds, a human moderator takes over the regulatory function—but said moderator has the opportunity to follow the content of the discussion and to recognize reactions of the guests to certain statements. If necessary, the moderator can intervene here, interrupt the speaker and let other guests have their say. This moderator function is advantageously realized by an aspect of the invention.

BRIEF DESCRIPTION OF THE DRAWINGS

An exemplary embodiment of the invention is illustrated in the drawing and will be described in more detail below. In the drawing:

The FIGURE shows a system architecture of group communication.

DETAILED DESCRIPTION OF EXEMPLARY EMBODIMENTS

A road user can report his current GPS position q to a server S via a computer program product, called an app for short, which runs either on a smartphone or a head unit in the vehicle. The server combines participants, who also have the same app and are in a definable area around an imaginary spatial center of a circle, for example, or around a focal point of an ellipse, to form a group and reports these group data back to the participants. The spatial area G can be determined in this case from an average of the spatial coordinates of all participants and can also move at the average speed v and with the average direction of the participants. The group is formed incrementally, for example, by first trying to form an initial group from new participants whose spatial coordinates and speed vectors have the best match. If a group has been determined by the server, a participant can request permission to speak if desired (token system). If this is granted, the participant can send a voice message to all other group participants, while the voice input option is blocked for the other participants. Thus, communication similar to the known CB radio is mapped to the modern mobile radio network. The app or the server can make each participant uniquely but anonymously identifiable by assigning an at least partially random participant number.

As an alternative to forming a group using one's own position and direction of travel, it is also possible to define thematic groups or groups at fixed locations.

In addition to the basic function, the following expansions are provided:

During a voice announcement by another participant, each other participant can express their wish to speak to everyone else simply by pressing a button or by voice command. The server S takes this user request into account, can also display it visually to all participants immediately and take it into account the next time the permission to speak is granted.

The radius for forming a group adapts dynamically to the number of participants or the utilization by speakers. This prevents groups from becoming too large or too small.

The position of other group participants can be visualized on a map. As can the current radius. If desired, the current speaker can be highlighted on the map and the distance between the speaker and one's own vehicle can be displayed.

Other participants 20, 30, 40 can rate the current speaker (Like/Dislike). A speaker's rating affects the granting of the permission to speak and the length of the voice message allowed. If two equally rated speakers want to transmit at the same time, the token is given to that speaker who has not spoken for the longest time or has until now used less speaking time in the current group.

Another method of granting the permission to speak may refer to the list of visualized user requests to speak. All participants can favor someone from this list by voice or manual command for the granting of the next permission to speak, and the server then opts, for example, for that participant who received the highest approval for the granting of the permission to speak.

Mixed forms of granting the permission to speak are also conceivable, so that, for example, the waiting time is included with increasing weight in the granting.

Users can give themselves a name, which they communicate to their app by voice or manual input, and which becomes visible to the other group members. Predefined groups that are not (only) bound to a radius can be created. For example groups for events (soccer game, concert). This means that road users with the same goal or the same interests can communicate with each other. Participants can create their own groups that other participants can join. This makes it possible to create more private small groups which can then remain even irrespective of the radius. If desired, private groups can be set up with encrypted communication.

The token-based permission to speak prevents communication from being intentionally paralyzed by interference sources. Dynamic radius adjustment ensures that the group size is always appropriate.

The system can be designed largely anonymously, so that a basis for non-binding communication between the participants is created. Nevertheless, mechanisms are foreseeable, such as by the speaker rating, which make it very difficult for intentional interference sources to undermine the joint conversation.

By means of a rating of the current speaker, it is possible to restrict 'unwanted' speakers, but on the other hand directly depriving them of their permission to speak is avoided. Care should be taken in this case to ensure that a democratic 'election' takes place and that the permission to speak is only restricted via the server S if there are multiple dislikes from different road users, for example from more than half of the group, and is not made possible by repeated dislikes of individuals. If a speaker is preferred, the approach mentioned also applies. Furthermore, when granting the permission to speak, the length of the speaking time or the period since last speaking is determined via the server S and taken into account when granting the permission to speak.

Provision is made for the 'withdrawal' of a road user's request to speak to be granted via the communication point to the server S, since a question may have become superfluous in the meantime, or the discussion has gone in a completely different direction, or the desire to discuss has waned.

First Exemplary Embodiment

A driver drives into a traffic jam. Unable to identify the cause of the traffic jam, the driver joins the group in the current radius. Another group participant is at the beginning of the traffic jam and can report how the road is cleared there after an accident.

Since other participants are also talking animatedly about the group, the participant at the beginning of the traffic jam rarely gets permission to speak.

However, since the driver is mainly interested in this speaker, he votes with a "Dislike" against uninteresting speakers and with "Like" for the interesting speaker. As a result, the speaker at the beginning of the traffic jam receives the token for the permission to speak more frequently.

Second Exemplary Embodiment

After ordering concert tickets online, the person receives an e-mail confirmation. This contains a link to the corresponding group of vehicles 10, 20, 30, 40. On the way to the concert, the person registers with this group and is connected to other concert-goers who are also currently on their way there. Although he is still several kilometers away from his destination, he can already exchange ideas with like-minded people and can make contact with people who are on the same stretch of freeway. The idea of continuing in a convoy arises spontaneously.

Third Exemplary Embodiment

Several colleagues in vehicles 10, 20, 30, 40 have a joint appointment with the customer. They are driving several vehicles. In order to be able to communicate with each other while driving, they set up a private group.

Fourth Exemplary Embodiment

A driver wants to be accessible to road users in his immediate vicinity. He joins the position-dependent group, but manually chooses a very small radius. As a result, he usually hardly receives any voice messages. Now he hears a voice message from a road user driving directly behind him who draws his attention to a defective rear light.

A 'deselect all' on the part of the person leaving the group is obvious for a complete exit from the group. In order to form small groups, there should be several 'deselects' by members of the small groups to exclude the members who should not join the small group, with gradual disconnection of the communication connections to the rest of the group. As long as the remaining members do not 'deselect', the original connection between them remains.

It is just as easy for the small group members to leave the group and then form a new group.

The invention claimed is:

1. A method for communication between road users, which can each connect to a server via at least one communication interface for communication, wherein the following steps are carried out in the method by the server for the purpose of establishing communication:
   establishing local and thematic information for determining communication participants;
   determining a group of communication participants on the basis of the local and thematic information, with a local area being defined for the local restriction of the communication participants and with at least one technological aspect and/or one interest- based aspect being taken as a basis for the thematic restriction on the part of the server; and
   granting permission for the communication of data by the road users based on a prioritization by the server of the data transmitted by the road users to the server once the group has been determined and one of a rating of a road user who requests a permission to speak by the group of communication participants or a length of speaking time or a period since the road user last spoke,
   wherein the local and thematic information is determined from the average of the spatial coordinates of the road users and the respective average speed and the average direction of the road users.

2. The method as claimed in claim 1, wherein a group of communication participants is determined incrementally, with new road users whose spatial coordinates and respective average speed and average direction have the greatest match forming an initial group of communication participants.

3. The method as claimed in claim 1, wherein, after the server has determined the group of communication participants and when the permission to speak is granted to the road user, the respective road user sends a voice message to the identified group of communication participants.

4. The method as claimed in claim 1, wherein when the permission to speak is granted, a voice message is sent to the identified group of communication participants and the voice input of the other road users is blocked via the server.

5. A vehicle unit comprising a communication unit for communication in a vehicle of a road user to the server, the server comprising a microprocessor, volatile and non-volatile memory and at least one communication interface, which are communicatively connected to the server via one or more mobile communication lines, wherein the microprocessor is configured to carry out the method as claimed in claim 1.

6. A computer program product comprising instructions that, when executed by a computer, cause said computer to carry out the method as claimed in claim 1.

7. A non-transitory computer-readable medium on which the computer program product as claimed in claim 6 is stored.

8. A vehicle having one or more vehicle units as claimed in claim 5.

9. The method as claimed in claim 2, wherein, after the server has determined the group of communication participants, a road user requests a permission to speak and, when the permission to speak is granted, the respective road user sends a voice message to the identified group of communication participants.

10. A method for communication between road users, which can each connect to a server via at least one communication interface for communication, wherein the following steps are carried out in the method by the server for the purpose of establishing communication:
    establishing local and thematic information for determining communication participants;
    determining a group of communication participants on the basis of the local and thematic information, with a local area being defined for the local restriction of the communication participants and with at least one technological aspect and/or one interest-based aspect being taken as a basis for the thematic restriction on the part of the server;
    granting permission for the communication of data by the road users based on a prioritization by the server of the data transmitted by the road users to the server once the group has been determined;
    after the server has determined the group of communication participants, receiving a request for permission to speak from a road user and when the permission to speak is granted to the road user, sending a voice message by the respective road user to the identified group of communication participants; and
    after the permission to speak is granted to the road user, rating the road user by the group of communication participants and restricting the permission to speak if there are multiple dislikes from different road users,
    wherein the local and thematic information is determined from the average of the spatial coordinates of the road users and the respective average speed and the average direction of the road users.

11. A method for communication between road users, which can each connect to a server via at least one communication interface for communication, wherein the following steps are carried out in the method by the server for the purpose of establishing communication:
    establishing local and thematic information for determining communication participants;
    determining a group of communication participants on the basis of the local and thematic information, with a local area being defined for the local restriction of the communication participants and with at least one technological aspect and/or one interest-based aspect being taken as a basis for the thematic restriction on the part of the server;
    granting permission for the communication of data by the road users based on a prioritization by the server of the data transmitted by the road users to the server once the group has been determined;
    after the server has determined the group of communication participants, receiving a request for permission to speak from a road user and when the permission to speak is granted to the road user, sending a voice message by the respective road user to the identified group of communication participants; and
    when granting the permission to speak to the road user, considering a length of speaking time or a period since the road user last spoke,
    wherein the local and thematic information is determined from the average of the spatial coordinates of the road users and the respective average speed and the average direction of the road users.

* * * * *